(12) United States Patent
Jöckel et al.

(10) Patent No.: US 10,998,780 B2
(45) Date of Patent: May 4, 2021

(54) SUPPORT STRUCTURE FOR A LAMINATED CORE OF A STATOR SEGMENT

(71) Applicant: Siemens Aktiengesellschaft, Munich (DE)

(72) Inventors: Andreas Jöckel, Nuremberg (DE); Andreas Lindmeier, Ruhstorf (DE); Franz Xaver Michael Schober, Neukirchen vorm Wald (DE); Andreas Seil, Tettenweis (DE)

(73) Assignee: FLENDER GMBH, Bocholt (DE)

( * ) Notice: Subject to any disclaimer, the term of this patent is extended or adjusted under 35 U.S.C. 154(b) by 117 days.

(21) Appl. No.: 16/478,771

(22) PCT Filed: Jan. 2, 2018

(86) PCT No.: PCT/EP2018/050008
§ 371 (c)(1),
(2) Date: Jul. 17, 2019

(87) PCT Pub. No.: WO2018/134043
PCT Pub. Date: Jul. 26, 2018

(65) Prior Publication Data
US 2019/0363591 A1 Nov. 28, 2019

(30) Foreign Application Priority Data
Jan. 18, 2017 (EP) .................... 17151989

(51) Int. Cl.
*H02K 1/18* (2006.01)
*H02K 1/16* (2006.01)
(Continued)

(52) U.S. Cl.
CPC ............. *H02K 1/187* (2013.01); *F03D 9/25* (2016.05); *H02K 1/16* (2013.01); *H02K 7/1838* (2013.01);
(Continued)

(58) Field of Classification Search
CPC .......... H02K 1/165; H02K 7/088; H02K 9/12; H02K 21/24; H02K 15/03
(Continued)

(56) References Cited

U.S. PATENT DOCUMENTS

| 4,425,523 A * | 1/1984 | Detinko ................. H02K 1/185 310/433 |
| 8,040,014 B2 * | 10/2011 | Boardman, IV ....... H02K 1/185 310/216.129 |

(Continued)

FOREIGN PATENT DOCUMENTS

| CN | 101673974 A | 3/2010 |
| CN | 102386695 A | 3/2012 |

(Continued)

OTHER PUBLICATIONS

PCT International Search Report and Written Opinion of International Searching Authority dated Apr. 23, 2018 corresponding to PCT International Application No. PCT/EP2018/050008 filed Jan. 2, 2018.

*Primary Examiner* — Jose A Gonzalez Quinones
(74) *Attorney, Agent, or Firm* — Henry M. Feiereisen LLC

(57) ABSTRACT

The invention relates to a support structure (17) for a laminated core (9) of a stator segment (13) of a dynamo-electric machine having an external rotor, the support structure (17) having two joint plates (6) and two curved pressure plates (1), the respective longitudinal faces of which are in each case mutually opposed, and which encompass a pre-definable space and can be connected at their abutting edges. The support structure also has substantially radial bars or ribs (3) between the pressure plates (1) and at least one element having polygonal cut-outs, which element is con- (Continued)

nected to a longitudinal face of the ribs (3) and forms a base plate of the support structure (17).

18 Claims, 4 Drawing Sheets

(51) Int. Cl.
*H02K 7/18* (2006.01)
*H02K 15/00* (2006.01)
*H02K 15/02* (2006.01)
*H02K 15/085* (2006.01)
*H02K 21/22* (2006.01)
*F03D 9/25* (2016.01)

(52) U.S. Cl.
CPC ....... *H02K 15/0062* (2013.01); *H02K 15/028* (2013.01); *H02K 15/085* (2013.01); *H02K 21/22* (2013.01); *F05B 2220/7068* (2013.01); *H02K 2201/15* (2013.01)

(58) Field of Classification Search
USPC ...................... 310/256.1, 402, 408, 418, 420
See application file for complete search history.

(56) References Cited

U.S. PATENT DOCUMENTS

| | | | |
|---|---|---|---|
| 8,813,333 B2* | 8/2014 | Vitello | H02K 15/0006 29/402.08 |
| 8,860,287 B2* | 10/2014 | Longtin | H02K 1/185 310/433 |
| 9,509,182 B2* | 11/2016 | Yamarthi | H02K 1/185 |
| 9,627,950 B2* | 4/2017 | Notarange | H02K 15/06 |
| 2010/0060099 A1 | 3/2010 | Seiki | |
| 2011/0266808 A1 | 11/2011 | Lokhandwalla | |
| 2012/0133145 A1 | 5/2012 | Longtin et al. | |
| 2012/0248781 A1 | 10/2012 | Casazza | |
| 2015/0222151 A1 | 8/2015 | Semken | |
| 2015/0349592 A1 | 12/2015 | Winkler | |

FOREIGN PATENT DOCUMENTS

| | | |
|---|---|---|
| CN | 102678462 A | 9/2012 |
| CN | 203 094 280 U | 7/2013 |
| CN | 104969444 A | 10/2015 |
| EP | 2 670 025 A1 | 12/2013 |
| EP | 2 838 182 A1 | 2/2015 |
| GB | 15 71 793 A | 7/1980 |
| WO | WO 2014/000757 A1 | 1/2014 |

* cited by examiner

SUPPORT STRUCTURE FOR A LAMINATED CORE OF A STATOR SEGMENT

CROSS-REFERENCES TO RELATED APPLICATIONS

This application is the U.S. National Stage of International Application No. PCT/EP2018/050008, filed Jan. 2, 2018, which designated the United States and has been published as International Publication No. WO 2018/134043 and which claims the priority of European Patent Application, Serial No. 1711989.5, filed Jan. 18, 2017, pursuant to 35 U.S.C. 119(a)-(d).

BACKGROUND OF THE INVENTION

The invention relates to a support structure for a laminated core, for a stator segment, for an external rotor generator, to a stator segment, to a stator, to an external rotor generator, to a wind turbine, and also to the manufacturing process for a stator segment and stator.

In the case of very large dynamoelectric machines, in particular slow running torque motors and generators, it is advantageous not to produce laminated cores of the stator as a whole unit. Consequently the laminated core of the stator is built with windings in a segmented construction, i.e. in segments that are later installed on the stator to form a closed ring.

In the case of directly driven wind turbine generators with an external rotor, the installation of the individual stator segments is carded out by screwing these stator segments onto flanges that are connected to the machine installation space of the nacelle of the wind turbine. A segmented construction in the case of stators with internal rotors is known for example from US 2012/0133145 or also from WO 2014/000757 A1.

The disadvantage in the case of these embodiments however is the enormous mechanical effort required to achieve a stable fastening of the stator segments and stator in the nacelle. Because adequate fastening is only achievable with corresponding mechanical effort and therefore additional weight, this is disadvantageous especially in the case of wind turbine nacelles.

On this basis the object underlying the invention is to create a support structure for the stator segments of a stator, which is particularly lightweight but which tolerates and can absorb the forces occurring during the operation of the wind turbine.

SUMMARY OF THE INVENTION

The set object is achieved by a support structure for a laminated core of a stator segment of a dynamoelectric machine having an external rotor, having
- two joint plates and two curved pressure plates, the respective longitudinal faces of which are in each case mutually opposed, encompass a predefinable space and can be connected at their abutting edges,
- substantially radial bars or ribs between the pressure plates,
- at least one element with polygonal cut-outs, which is connected to a longitudinal face of the ribs and forms a base plate of the support structure.

The set object is likewise achieved by a stator segment having a support structure in accordance with the invention, wherein the pressure plates, together with pressure fingers arranged radially on the end faces of a laminated core, axially fasten this laminated core. For this reason the laminated core is a stable assembly, irrespective of whether it is formed as a single piece or from partial laminated cores axially spaced apart from one another.

The set object is likewise achieved by a stator segment of a dynamoelectric machine having a support structure in accordance with the invention, wherein an axial fastening of the laminated core is carried out by means of pressure plates and by bonding the last and first layers of the laminated core using bonding varnish. Also for this reason the laminated core is a stable assembly, irrespective of whether it is formed as a single piece or from partial laminated cores axially spaced apart from one another. Here both the respective layers of the partial laminated core or also the layers of the core as a whole can be bonded.

The set object is likewise achieved by a stator having stator segments in accordance with the invention, wherein, when viewed in the peripheral direction, the stator segments are mechanically connected at least to joint plates, which can be arranged adjacently, of a further stator segment.

Additional fastening of the stator segments to a radially internal sub-structure by means of a form-fit or firmly bonded connection produces a further reinforcement of the whole stator.

The set object is likewise achieved by an external rotor generator having a stator in accordance with the invention, which is suitably connected in a torsion-resistant fashion to a nacelle frame of the wind turbine, said frame in turn supporting the nacelle of the wind turbine.

The set object is likewise achieved by a wind turbine having such an external rotor generator, wherein with a comparatively low weight of the stator and therefore the nacelle, the installation of the whole wind turbine is made simpler as a result, for example.

The set object is likewise achieved by a manufacturing process for a stator segment in accordance with the invention, by means of the following steps:
- Providing a support structure having joint plates, bars and pressure plates connected to one another on a longitudinal face of the bars by means of a polygonal element, in particular a mesh sheet,
- Arranging a pre-packaged laminated core of the stator segment on the support structure on the side of the bars facing away from the mesh sheet,
- Inserting a winding system, in particular a coil winding system, into the grooves in the laminated core of the stator segment.

The set object is likewise achieved by a manufacturing process for a stator in accordance with the invention, by means of the following steps:
- Assembling individual stator segments by connecting the stator segments together by their joint sheets and/or by means of a sub-structure extending over the stator segments,
- Establishing electrical contacts with a winding system for the individual coils of the stator segments and with at least one converter.

According to the invention, the support structure now only has the mechanical parts necessary in order to maintain adequate fastening and stabilization of the stator segments and of the stator, and ultimately of the external rotor generator as a whole, in order to be able to absorb the forces occurring during the operation of the wind turbine, for example.

This embodiment of the support structure similarly allows a high level of accuracy to be ensured in the air gap contour of the external rotor generator. The air gap between the rotor of the external rotor generator and the stator can be made more precise and durable by means of this construction.

By means of the element with polygonal cut-outs, which is provided on the radially internal side of the support structure and fastens the individual bars and/or the pressure plates and/or the joint plates to one other, in particular using welded connections, the support structure is now constructed from relatively simple basic elements. Together with the laminated core, it consequently forms a self-supporting, comparatively light sandwich construction.

As such, the element represents a type of base plate for the support structure.

The space encompassed by joint plates and pressure plates is received on the concave side by the element and on the convex side by the laminated core.

In particular, the supporting properties of the laminated core, which is fitted and welded from the convex side onto the support structure, are then integrated into the support structure. The laminated core of the stator segment consequently assumes not only an electromagnetic function of forming and directing the electromagnetic field, but also simultaneously a mechanical supporting function.

The element, in particular a mesh sheet, is positioned and fastened onto the concave part of the support structure. The laminated core is positioned and fastened onto the convex part of the support structure.

Advantageously the required rigidity of a stator segment is then achieved with a minimum of material and wall thickness, which in turn represents the prerequisite for a comparatively low weight and low costs. The low weight is particularly advantageous for the transportation of the stator segments, the installation of the stator in a nacelle of a wind turbine in particular.

Tangential ribs in stator segments or in the stator, as previously known, can consequently be eliminated completely. In addition to the weight saving, this creates a more manufacturable and simpler variant of every possible weld seam by providing a comparatively better accessibility of the predefined welding spots in the support structure.

Advantageously the element made of non-magnetic sheet metal that is provided on the radially internal side of the support structure, i.e. the concave side, and the individual bar elements and/or the pressure plates and/or the joint plates are fastened to one other, in particular using welded connections. Thus, the support structure is now constructed from relatively simple basic elements and consequently, together with the laminated core of a stator segment, forms a self-supporting sandwich construction.

The cut-outs of the element or of the sheet metal are embodied in a rounded or angled shape. The sheet metal thus forms a mesh sheet. As a result, the weight is reduced further without compromising the associated rigidity in the relevant layer of the element or sheet.

Advantageously the mesh sheet is designed here such that, in the direction of the curvature of the support structure, which curvature is predefined by the curved pressure plates, the mesh size corresponds to the gap in the bars or ribs, or that, in the direction of the curvature, the mesh size corresponds to an integer multiple of the gap in the bar elements. The weight is then optimized further.

The meshes are advantageously formed by webs extending in parallel and perpendicularly to the bars or ribs. Here the webs are welded, at least in sections, in the direction of the bars and to the narrow faces of the bars. In order then to be able to create enough welding spots, the webs must be at least twice as wide, at least at the welding spots, as the width of the bar at that point. I.e. the bars can be curved as they extend from one pressure plate to others, in particular such that there are differences in the height and/or thickness of the bars. This produces a further weight saving without compromising the mechanical strength of the support structure.

Adequate positioning and fastening of the stator segments is ensured by means of the mesh sheet on the concave side of the support structure and the laminated core on the convex side of the support structure, together with the pressure plates and pressure fingers as well as the joint plates. Consequently the air gap in the external rotor generator can be made highly precise.

The joint plate, pressure plate and mesh sheet are preferably made of common grades of steel, which further reduces the material costs of such a support structure and makes handling easier.

BRIEF DESCRIPTION OF THE DRAWING

The invention and further advantageous embodiments thereof will now be described in greater detail by reference to outline visualizations of exemplary embodiments; in the figures:

FIG. 1 shows a support structure 17 which, in the further manufacturing process, forms the basis of a stator segment 13 of a stator 12 of a directly driven external rotor generator of a wind turbine.

DETAILED DESCRIPTION OF THE PREFERRED EMBODIMENTS

Figure 1:
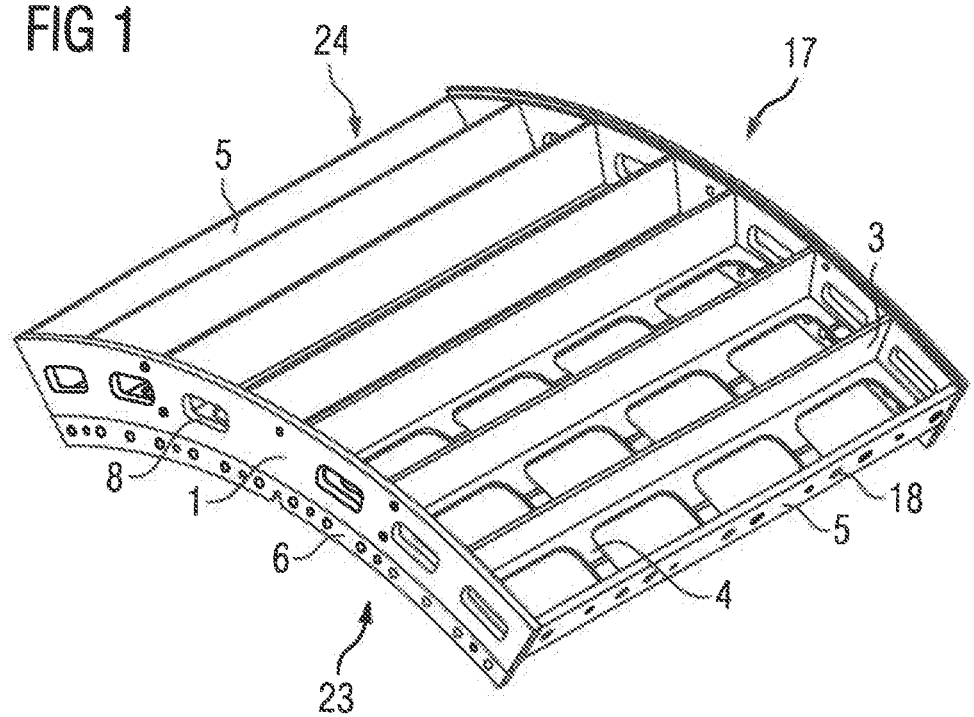
FIG. 1 shows a perspective representation of a support structure.

This support structure 17 is curved and has joint plates 5 which, in the installed state of the stator segments 13, establish a mechanical contact with further stator segments 13 directly adjacent in the peripheral direction. The support structure 17 has a concave part 23 and a convex part 24. There are pressure plates 1 on the end faces of the support structure 17, preferably with holes 8 through which cooling air can be conducted in or out to cool the laminated core 9 of the stator 12 during the operation of the wind turbine.

In another embodiment the pressure plates 1 are closed, i.e. they do not have holes 8. Consequently the support structure 17 is more or less open only at the top and bottom. When viewed in a tangential plane the support structure 17 is therefore closed.

Flanges 6 of the pressure plate 1 are provided radially further inside on the concave side of the support structure 17, which flanges allow a connection to further fastening devices e.g. of a bearing unit 16 of the directly driven wind turbine.

Bar elements, bars or ribs 3 extend essentially radially between the pressure plates 1 and are connected to a mesh sheet 4 in a firmly bonded manner, in particular by means of welding. In this case the gap in the webs 7 of the mesh sheet 4 extending between the pressure plates 1, in other words the mesh size, then corresponds to the gap in the ribs 3. Here the webs 7 are at least twice as wide as the bar elements or ribs 3 at their connection point to the ribs 3. With varying thicknesses of the bars 3 and/or webs 7, this prerequisite is especially important in order to ensure a firmly bonded connection of the web 7 and rib 3.

The bars or ribs 3 preferably extend on or adjacent to the webs 7 in order in principle to enable spot or linear welding of ribs 3 and webs 7 of the mesh sheet 4 to these webs 7.

Figure 2:
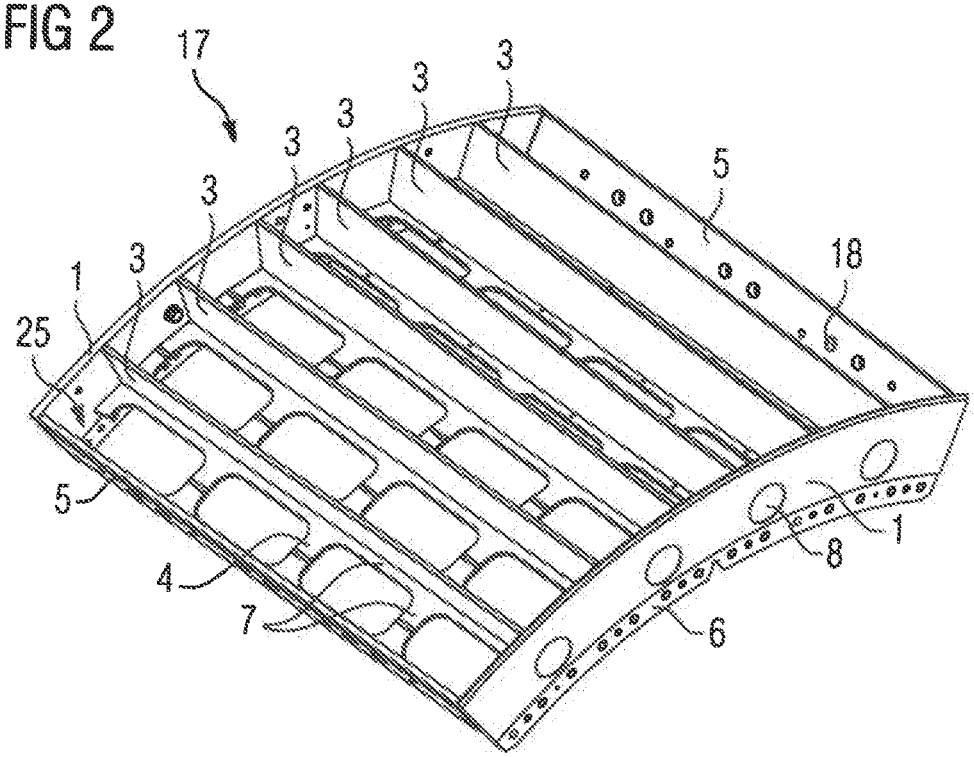
FIG. 2 shows a perspective representation of a further support structure.

FIG. 2 shows a perspective representation of a further, similar variant of the support structure 17 wherein the joint sheets 5 have fastening holes 18 in order to be connected mechanically to further joint sheets 5 of adjacent stator segments 13. The pressure plate 1 likewise exhibits holes 8 that are rounded in this case Between the webs 7 extending axially, in other words the webs 7 following the curvature in the peripheral direction, sections of the material of the mesh sheet 4 have a slight thinning 21, in order to enable the mesh sheet 4 to be bent slightly to form the curvature. This is advantageous especially in the case of thicker mesh sheets 4, the thickness of which approximately corresponds to that of, or which are even thicker than, the pressure plates.

Figure 3:
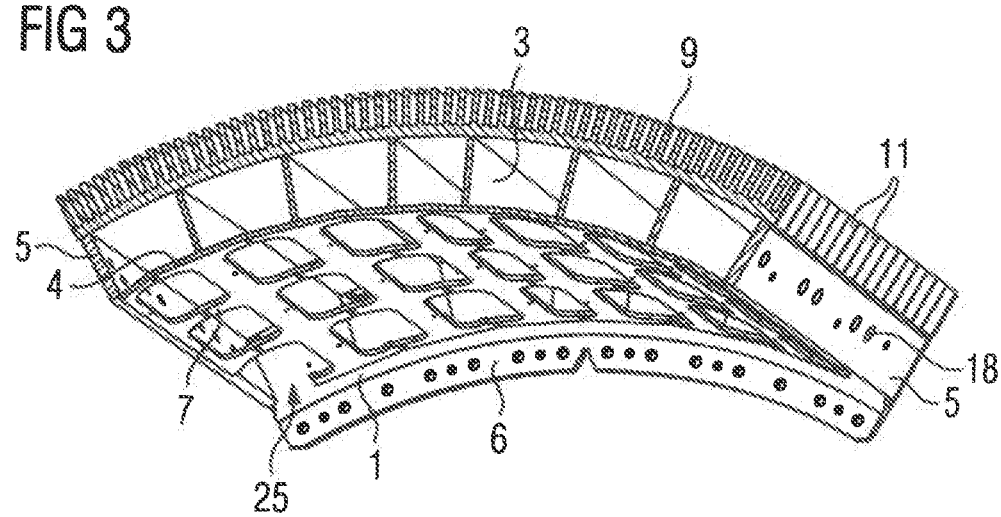
FIG. 3 shows a cross-section of a stator segment without windings.

FIG. 3 shows, in a cross-section of a stator segment, the arrangement of the laminated core 9 on the bar-shaped elements or ribs 3 and between the pressure plates 1, as well as the fastening of the ribs 3 onto the axially-extending webs 7 of the mesh sheet 4. The arrangement of the flange 6 of the pressure plate 1 can also be seen, with which the stator segments 13 can be fastened to further fastening elements of a bearing unit 16 or sub-structure 22 (in each case not shown).

The mesh sheet 4 has an open mesh 25 in at least one corner in order to be able to compensate better for the forces occurring during welding operations, for example.

Figure 4:
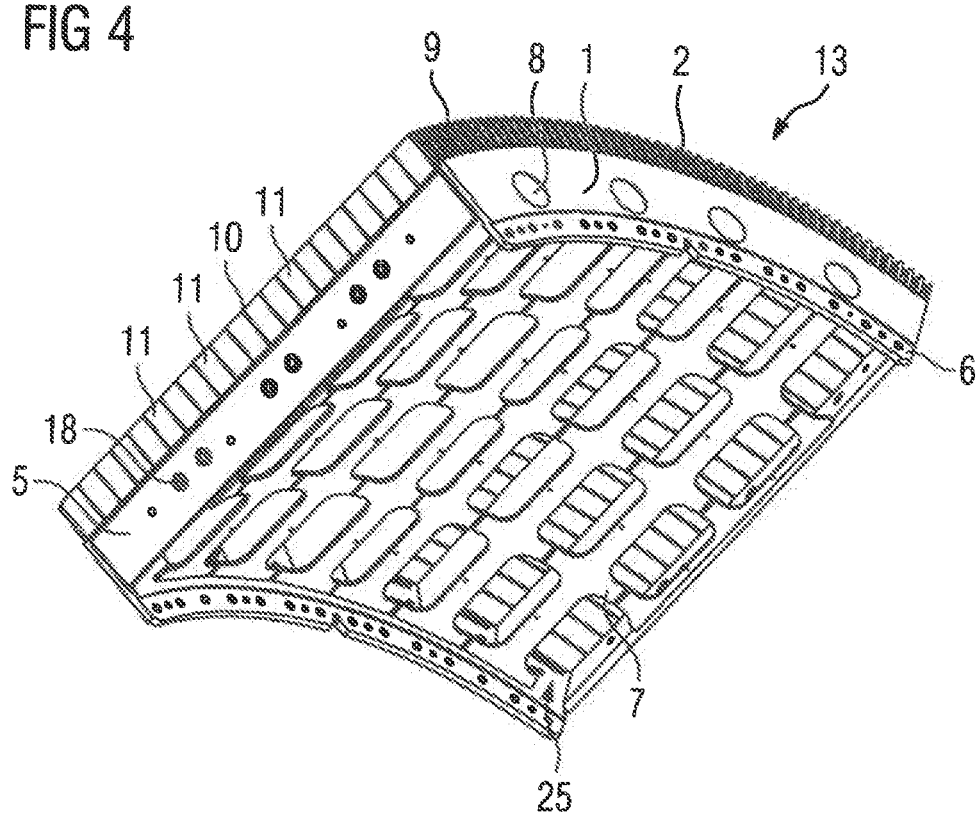
FIG. 4 shows a further representation of a stator segment.

FIG. 4 shows a further perspective representation of a stator segment 13 without the winding system, wherein the axially layered laminated core 9 is fastened, positioned and packaged by means of the pressure plate 1 as well as pressure fingers 2. In this representation the laminated core 9 is constructed by axially lining up partial laminated cores 11. Spacing apart these partial laminated cores 11 produces cooling vents 10 between the partial laminated cores 11, which enable cooling of the stator segment 13 and consequently the stator during the operation of the generator or motor. The spacing is achieved by means of intermediate elements extending radially that are inserted while packaging the laminated core 9.

Alternatively, the axially layered laminated core 9 of the stator segment 13 can also be fastened, positioned and packaged by means of the pressure plate 1 and by bonding the first and last layers of the laminated core 9 using bonding varnish so that pressure fingers 2 then need not necessarily be present. In each case three up to approx. 20 layers are then provided with bonding varnish. In certain variants this can simplify the manufacture of a stator segment 13.

Figure 5:
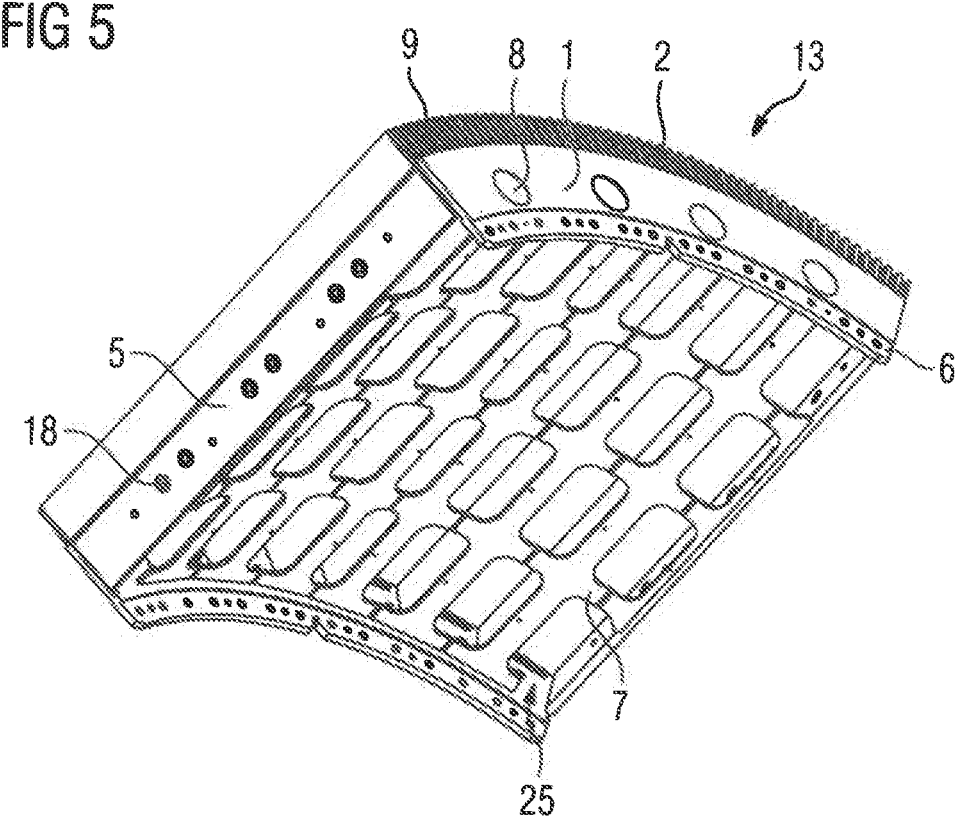
FIG. 5 shows a support structure with a single-piece laminated core.

FIG. 5 shows a further perspective representation of a stator segment 13 without the winding system, wherein the axially layered laminated core 9 is fastened, positioned and packaged by means of the pressure plate 1 as well as pressure fingers 2. In this representation the laminated core 9 is designed as a single-layer laminated core 9 having no spacers extending radially that form cooling vents 10 between the partial laminated cores 11.

Figure 6:
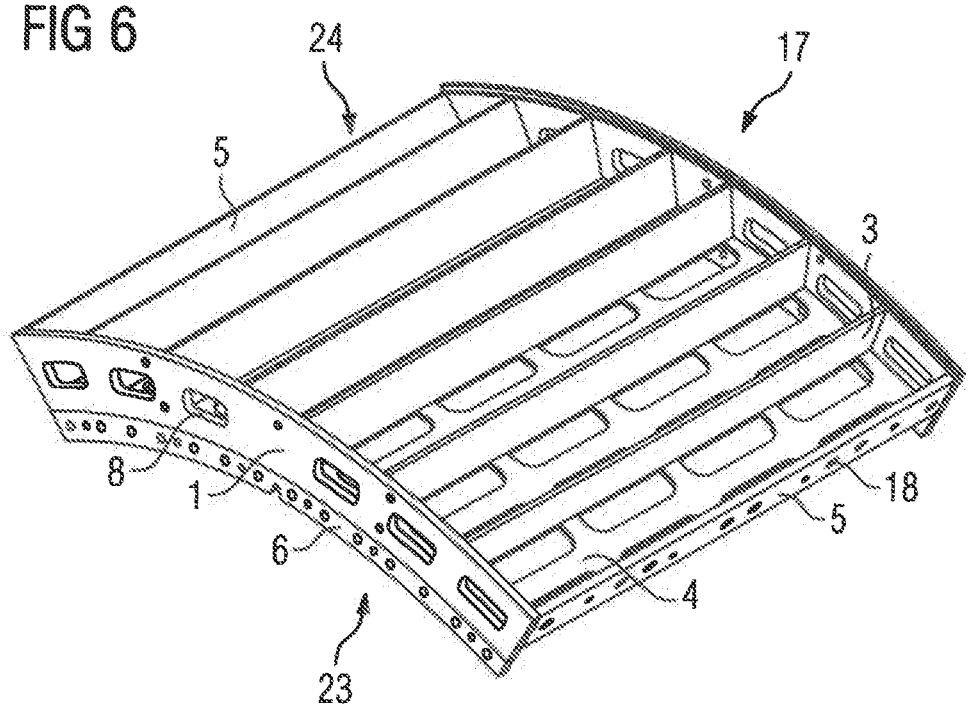
FIG. 6 shows a support structure with an offset mesh sheet.

FIG. 6 shows a perspective representation of the support structure 17 in which the ribs 3 run "over" the meshes of the mesh sheet 4. In other words, the ribs 3 that extend from one side of the laminated core 9, i.e. from one pressure plate 1 to the other pressure plate 1, only have contact points with the mesh sheet 4 at the webs extending tangentially. Accordingly, a connection between the ribs 3 and the mesh sheet 4, in particular the webs extending tangentially, is only created here. The connection is preferably a welded connection.

In the variants presented here, the welded connections are preferably realized as spot or linear welds.

In one possible variant, the thickness of the almost cuboidal bars or bar elements or ribs, but also of the mesh sheet, is in this case approximately twice as thick as the pressure plates 1 or joint plates 5.

In a further possible variant, the thickness of the almost cuboidal bars or bar elements or ribs 3, but also of the mesh sheet 4, is approximately the same as the thickness of pressure plates 1 or joint plates 5.

These "thickness variants" depend inter alia on the possible mechanical stresses expected during the operation of the wind turbine.

Figure 7:
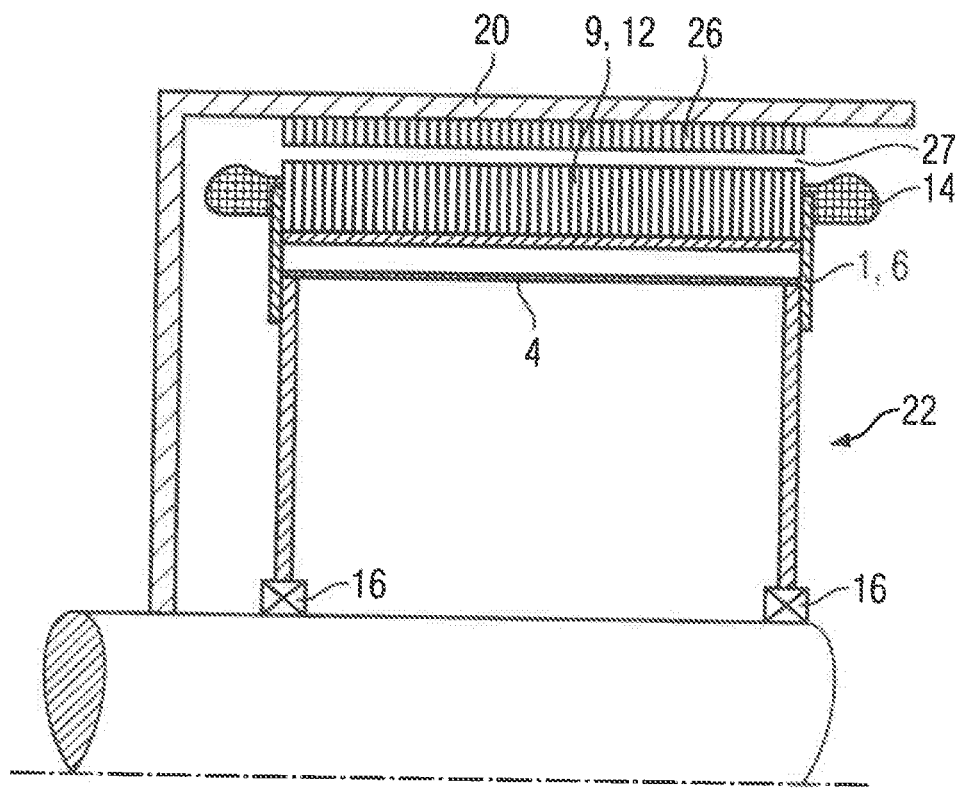
FIG. 7 shows an outline longitudinal section through an external rotor generator of a directly driven wind turbine.

FIG. 7 shows in an outline longitudinal section the arrangement of the stator 12 on a bearing unit 16. This representation also shows the rotor 20 as an external rotor of the generator having permanent magnets 26 pointing toward the air gap 27 of the dynamoelectric machine. The single-layer or double-layer winding system 14 shown here in outline form can be realized in this case using form-wound coils of equal or unequal coil pitch. Likewise, corded windings as well as lap windings may also be used, Preferably each stator segment 13 is supplied with its complete winding system 14 and connected electrically to a stator 12 on the construction site.

A construction of this type is suitable not only for wind turbine generators; the support structure 17 is also suitable as the basis for large motors in drives, e.g. in extractive industry.

What is claimed is:

1. A support structure for a laminated core of a stator segment of a dynamoelectric machine having an external rotor, said support structure comprising:
    two joint plates configured to establish a mechanical contact of the stator segment, when installed, with a further stator segment disposed directly adjacent in a peripheral direction;
    two curved pressure plates having longitudinal faces in opposite disposition, the curved pressure plates and the joint plates encompassing a predefined space and connectable at their abutting edges;
    substantially radial bars or ribs extending between the pressure plates and in parallel relation to the joint plates; and
    an element having polygonal cut-outs and connected to a longitudinal face of the ribs, said element forming a base plate of the support structure and having a mesh-type structure to form a mesh sheet,
    wherein the space encompassed by the joint plates and the pressure plates is demarcated on a concave side by the element and on a convex side by the laminated core which is fitted and welded from the convex side onto the support structure and thereby integrate a supporting property of the laminated core into the support structure so that the laminated core of the stator segment assumes an electromagnetic function for forming and directing a electromagnetic field and at a same time a mechanical supporting function.

2. The support structure of claim 1, wherein the element is made of sheet metal.

3. The support structure of claim 1, wherein the mesh sheet has a mesh size which corresponds to a gap in the ribs or to an integer multiple of the gap in the ribs.

4. A stator segment of a dynamoelectric machine, said support segment comprising:
a laminated core; and
a support structure comprising
two joint plates configured to establish a mechanical contact of the stator segment, when installed, with a further stator segment disposed directly adjacent in a peripheral direction,
two curved pressure plates having longitudinal faces in opposite disposition, the curved pressure plates and the joint plates encompassing a predefined space and connectable at their abutting edges,
substantially radial bars or ribs extending between the pressure plates and in parallel relation to the joint plates,
an element having polygonal cut-outs and connected to a longitudinal face of the ribs, said element forming a base plate of the support structure and having a mesh-type structure to form a mesh sheet, wherein the space encompassed by the joint plates and the pressure plates is demarcated on a concave side by the element and on a convex side by the laminated core which is fitted and welded from the convex side onto the support structure and thereby integrate a supporting property of the laminated core into the support structure so that the laminated core of the stator segment assumes an electromagnetic function for forming and directing a electromagnetic field and at a same time a mechanical supporting function, and
radial pressure fingers arranged radially on end faces of the laminated core which together with the pressure plates axially fasten the laminated core.

5. A stator segment of a dynamoelectric machine, said support segment comprising:
a laminated core having a plurality of laminations; and
a support structure comprising
two joint plates configured to establish a mechanical contact of the stator segment, when installed, with a further stator segment disposed directly adjacent in a peripheral direction,
two curved pressure plates having longitudinal faces in opposite disposition, the curved pressure plates and the joint plates encompassing a predefined space and connectable at their abutting edges,
substantially radial bars or ribs extending between the pressure plates and in parallel relation to the joint plates,
an element having polygonal cut-outs and connected to a longitudinal face of the ribs, said element forming a base plate of the support structure and having a mesh-type structure to form a mesh sheet, wherein the space encompassed by the joint plates and the pressure plates is demarcated on a concave side by the element and on a convex side by the laminated core which is fitted and welded from the convex side onto the support structure and thereby integrate a supporting property of the laminated core into the support structure so that the laminated core of the stator segment assumes an electromagnetic function for forming and directing a electromagnetic field and at a same time a mechanical supporting function,
wherein an axial fastening of the laminated core is realized by the pressure plates and by bonding a last ones and first ones of the laminations of the laminated core via bonding varnish.

6. A stator of a dynamoelectric machine, comprising:
a stator segment as set forth in claim 4, wherein when viewed in a peripheral direction, the stator segment is mechanically connected to a joint plate of an adjacent stator segment.

7. The stator of claim 6, wherein a plurality of said stator segment are connected together by the joint plates and by a sub-structure which extends over the stator segments.

8. A stator of a dynamoelectric machine, comprising:
a stator segment as set forth in claim 5, wherein when viewed in a peripheral direction, the stator segment is mechanically connected to a joint plate of an adjacent stator segment.

9. The stator of claim 8, wherein a plurality of said stator segment are connected together by the joint plates and by a sub-structure which extends over the stator segments.

10. An external rotor generator or external rotor motor, comprising:
a stator as set forth in claim 6; and
a rotor interacting with the stator and including permanent magnets.

11. An external rotor generator or external rotor motor, comprising:
a stator as set forth in claim 8; and
a rotor interacting with the stator and including permanent magnets.

12. A wind turbine, comprising an external rotor generator as set forth in claim 10.

13. A wind turbine, comprising an external rotor generator as set forth in claim 11.

14. A process for the manufacture of a stator segment, comprising:
providing a support structure as set forth in claim 1, with the joint plates, ribs and pressure plates being connected to one another on a longitudinal face of the ribs by the element with polygonal cut-outs;
arranging a pre-packaged laminated core on the support structure on a side of the ribs facing away from the element; and
inserting a winding system into grooves in the laminated core.

15. The process of claim 14, wherein the element is a mesh sheet.

16. The process of claim 14, wherein the winding system is a coil winding system.

17. A process for the manufacture of a stator, comprising:
assembling individual stator segments as set forth in claim 4 by connecting the stator segments together by their joint plates and/or by a sub-structure extending over the stator segments; and
establishing an electrical connection with a winding system for individual coils of the stator segments and with a converter.

18. A process for the manufacture of a stator, comprising:
assembling individual stator segments as set forth in claim 5 by connecting the stator segments together by their joint plates and/or by a sub-structure extending over the stator segments; and
establishing an electrical connection with a winding system for individual coils of the stator segments and with a converter.

* * * * *